United States Patent [19]
Dunmire

[11] 3,779,272

[45] Dec. 18, 1973

[54] PIPE SADDLE ASSEMBLY

[75] Inventor: Paul G. Dunmire, Oakland, Calif.

[73] Assignee: Johns-Manville Corporation, Arapahoe, Colo.

[22] Filed: July 27, 1972

[21] Appl. No.: 275,481

Related U.S. Application Data

[60] Division of Ser. No. 38,342, May 18, 1970, Pat. No. 3,687,480, which is a continuation-in-part of Ser. No. 826,563, May 21, 1969, abandoned.

[52] U.S. Cl.................. 137/315, 285/197, 137/318
[51] Int. Cl............................................ F16k 43/00
[58] Field of Search.................... 137/315, 317, 318; 285/197

[56] References Cited
UNITED STATES PATENTS

| 2,703,721 | 3/1955 | Montgomery | 285/197 |
| 2,966,814 | 1/1961 | Mueller et al. | 137/318 |
| 3,045,512 | 7/1962 | Risley | 137/318 |
| 3,307,435 | 3/1967 | Floren | 137/318 |

*Primary Examiner*—Martin P. Schwadron
*Assistant Examiner*—David R. Matthews
*Attorney*—Baylor G. Riddell

[57] ABSTRACT

A pipe saddle assembly employing a flexible strap adapted to be disposed about a pipe into which a branch line is to be made. The saddle assembly includes lugs cooperating with the ends of the band and bolts for drawing the lugs together to tension the band. The bolts ride on fulcrums supported by a boss element to be drawn against the pipe. A seal ring interposed between the boss element and pipe seals against leakage.

4 Claims, 17 Drawing Figures

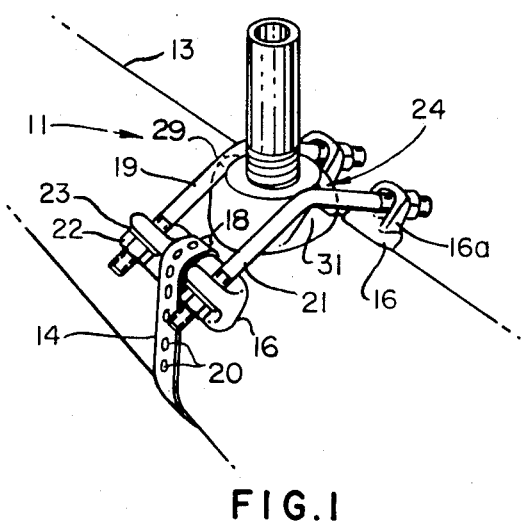
FIG.1
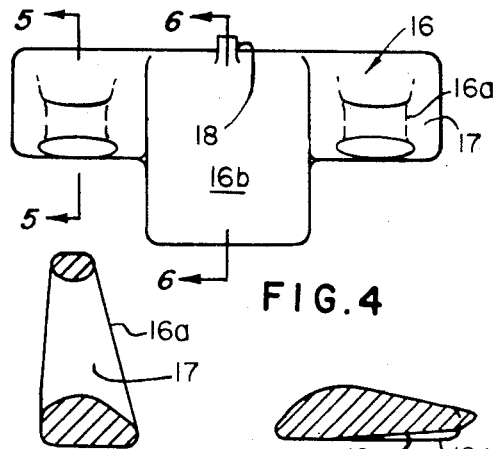
FIG.4
FIG.5
FIG.6
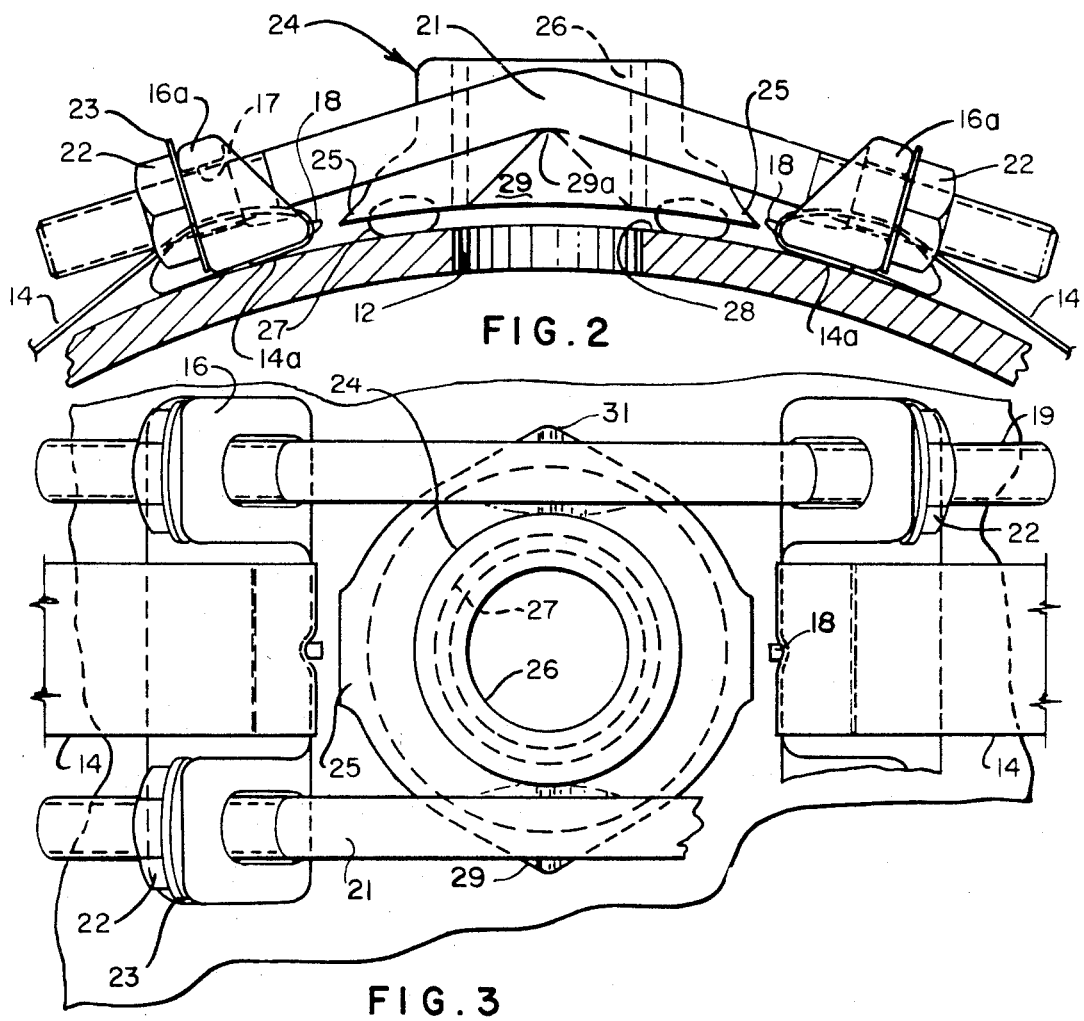
FIG.2
FIG.3

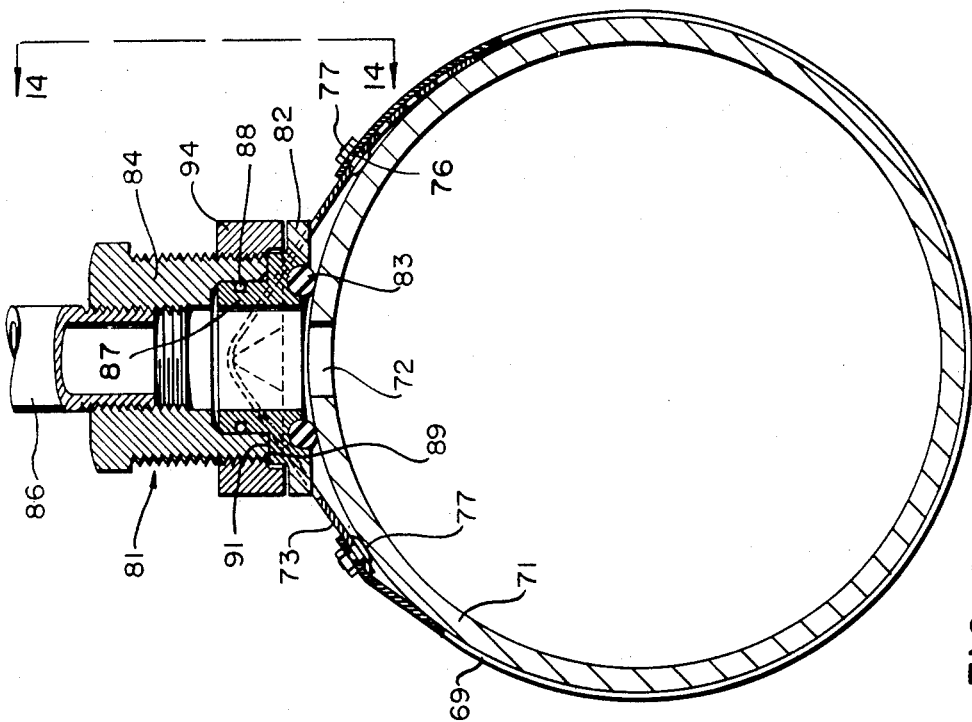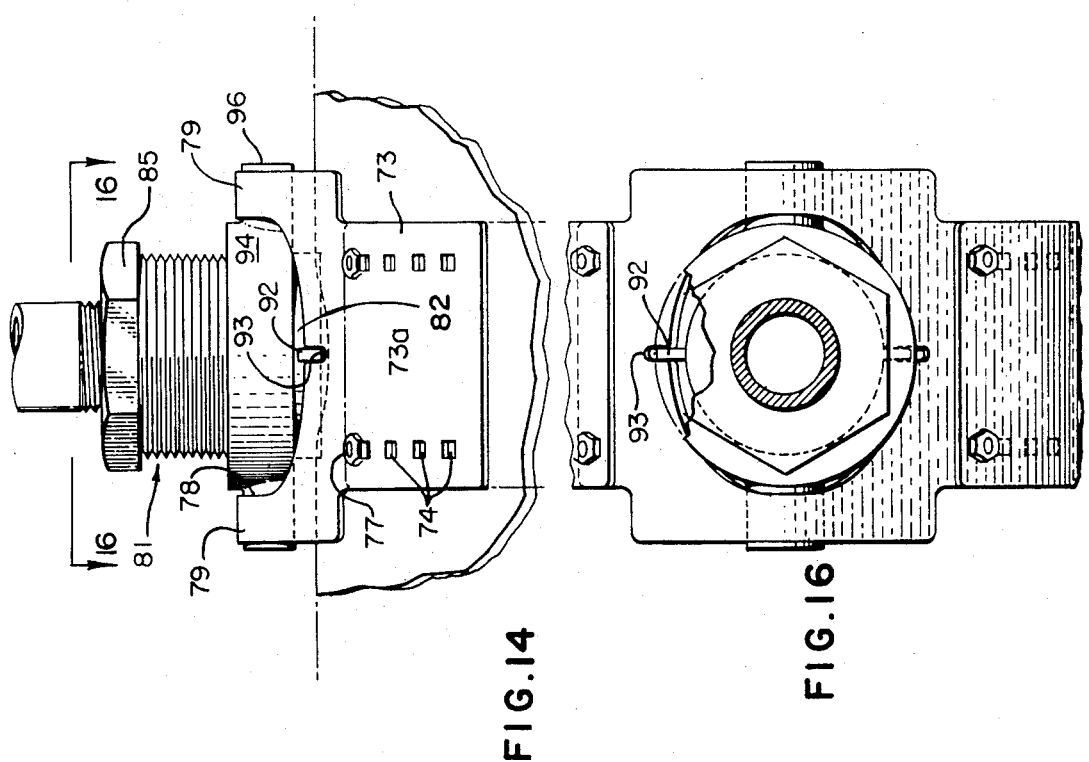

3,779,272

PIPE SADDLE ASSEMBLY

CROSS-REFERENCE TO RELATED APPLICATION

This application is a division of copending application entitled PIPE SADDLE ASSEMBLY, Ser. No. 38,342, filed May 18, 1970, now U.S. Pat. No. 3,687,490 which was a continuation-in-part of then copending application entitled PIPE SADDLE ASSEMBLY, Ser. No. 826,563, filed May 21, 1969 now abandoned.

BACKGROUND OF THE INVENTION

This invention pertains to pipe saddle assemblies of a type for making a branch line connection from a "main line" to a service line or other run of pipe and is particularly useful with respect to applications in the water works field. As is known, pipe saddles are usually attached to the main line prior to piercing the main line to form a branch line outlet. The saddle assembly then remains in place.

Pipe saddles heretofore have presented a number of problems which the industry has long sought to correct. For example, some pipe saddle assemblies are subject to placing undue strain on the back side of the pipe when the assembly is tightened about the pipe so as to crush the back side of the pipe. Other designs purport to "wrap around" the pipe, contacting it at four spaced points to avoid crushing it by pressures applied merely at top and bottom. These types of saddles are generally limited to a single given size of pipe and, therefore, there must be maintained a rather large inventory of saddles in order to accommodate the conventional wide range of pipe sizes. Also, this "wrap around" design requires an inordinate amount of tension on the bolts or straps in order to effect a seal between the saddle and pipe to which it is affixed.

In addition, where saddle assemblies of a type adapted to accommodate a wide range of pipe sizes have been tried in the past, difficulty has been found in applying compressive forces directly to the sealing gasket and this has resulted in an indispensable seal formed about the transverse opening tapped into the service line. Thus, saddles heretofore have been at times ineffective in preventing undesirable leaking at the branch line connection and, therefore, certain types have not generally been accepted in the trade.

In addition to the above, many prior art saddle assemblies have been characterized by an undue multiplicity of parts which has caused problems of maintaining proper inventory for a number of sizes as well as inordinate expense in manufacture of these saddle assemblies.

In addition to the above, prior pipe saddle assemblies have typically been unhandy and awkward to install in the locations usually encountered in typical installations. Thus, for example, it is not uncommon to find that the take-up bolts and other works of the assembly will necessarily be located at the back of the pipe to which the saddle is being attached. Such an arrangement, though common, contributes to an improperly applied saddle which later leaks and thus calls for experienced personnel to make proper installation.

As disclosed herein, the entire works of the saddle assembly have been collected at the general region of the saddle outlet forming the branch line connection whereby all the working parts of the assembly are readily accessible to view during installation by a worker.

Also, as disclosed herein, a saddle or hub member is provided suitable for a wide range of pipe sizes. Unique means are employed so as to press the saddle straight against a seal ring lying against the wall of the pipe while uniformly distributing the applied pressure around the seal ring.

Thus, the above means permits the saddle to align its undersurface to the pipe run, and equalizes the seal ring pressures around the branch line hole.

A saddle assembly as disclosed herein has been combined with a valve to form a boss saddle valve construction providing significant advantage not heretofore obtainable. In one embodiment, the valve can be made integral to the saddle and not at the same time require excessive inventory of valves. In another embodiment, one of a selection of valves can be associated with the saddle and employed to tighten the saddle strap about the run of pipe to which the saddle is being attached.

SUMMARY OF THE INVENTION AND OBJECTS

According to the present invention, a boss saddle valve construction has been provided for making a tightly sealed valve controlled connection to a fluid passage formed transversely into a pipe line. The construction is characterized by a flexible band which is strapped around the pipe. The ends of the band or strap are disposed adjacent to the branch outlet position. Valve means formed with a flow passage therein are aligned with the fluid passage and a resilient seal disposed between the bottom of the valve means and that annular margin of the pipe encircling the fluid passage. Readily attachable tensioning means for interconnecting the ends of the strap extend across the fulcrum elements carried by the valve means to extend along the pipe and means are provided for tightening the strap so as to draw the hub tightly against a seal interposed between the bottom of the valve means and the pipe to provide a pressure-tight joint from the "main line" to the transverse "branch".

By utilizing the fulcrum elements as herein to be described, the tensioning forces will be evenly taken up on both sides of the hub.

In general, it is an object of the present invention to provide an improved boss saddle valve construction.

Another object of the invention is to provide a boss saddle valve construction wherein a single valve size can be utilized with a wide range of pipe sizes even though the valve and saddle are formed as an integral unit.

A further object of the invention is to provide a boss saddle valve construction wherein rotation of the valve serves to tighten the strap holding the construction to the pipe.

These and other objects of the invention will become more clearly apparent from the following detailed description of preferred embodiments according to the invention.

BRIEF DESCRIPTION OF THE DRAWING

FIG. 1 is a schematic perspective view showing a pipe saddle assembly according to the invention;

FIG. 2 is an end elevation view of the structure shown in FIG. 1;

FIG. 3 is a plan view of a portion of FIG. 2;

FIG. 4 is a plan view of a component of the structure shown in FIG. 1;

FIGS. 5 and 6 are elevation section views taken along the lines 5—5 and 6—6 respectively of FIG. 4;

FIG. 14 is a side elevation view according to another embodiment of the invention;

FIG. 15 is an end elevation view in section taken along the line 15—15 of FIG. 14;

FIG. 16 is a plan view of FIG. 14 taken along the line 16—16 thereof;

DESCRIPTION OF THE PREFERRED EMBODIMENTS

Figure 9:
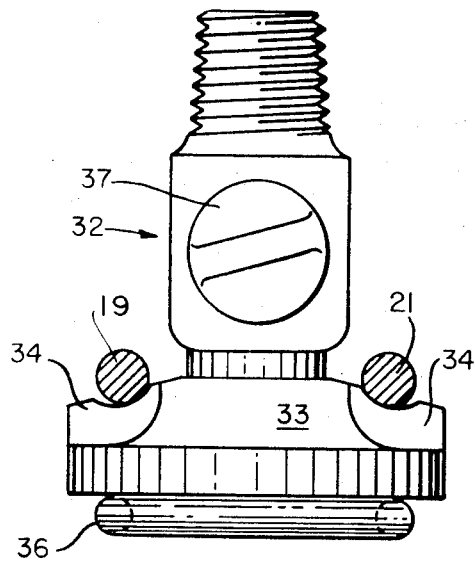
FIG. 9 is a side elevation view partly in section according to another embodiment of the invention.
Figure 7:
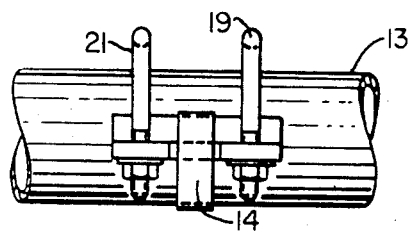
FIGS. 7 and 8 are side elevation views demonstrating the sequence of application of the pipe saddle assembly to a run of pipe.
Figure 8:
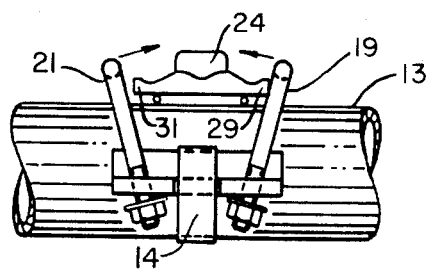

A pipe saddle assembly 11 for making a tightly sealed connection to a fluid passage 12 to be later formed transversely into a pipe line 13 or other run of pipe, comprises an elongated flexible strap 14, preferably of stainless steel or other corrosion resistant material having considerable strength and flexibility. During installation, strap 14 is simply passed behind pipe line 13 whereby the ends of strap 14 may be attached at a convenient location in the general region of the branch connection.

Means for interconnecting the ends of strap 14 include lugs 16. Each lug is formed as by casting to include a pair of outwardly projecting bolt-receiving take-up portions 16a which flank a band-attaching portion 16b provided on its undersurface with a shallow recess 16c between the flat undersurfaces 16d of the shoulder portions 17. Further, a projecting nib 18 extends from the leading edge of portion 16b to engage one of several detent holes 20 formed centrally along the ends of strap 14.

Thus, the ends of strap 14 are bent to conform to the rounded contour of the leading edge of lugs 16 and the extreme end portions 14a (FIG. 2) of strap 14 lie in recess 16c. When tightened, by means of the bolts 19, the flat undersurfaces 16d disposed laterally at the sides of strap 14, ride on the pipe surface and stabilize the leading edge of lug 16 and the strap in the region of saddle member 24.

The gradually diminishing depth of recess 16c serves to cause the trailing end of strap 14 to become pinched between the outer pipe wall and the undersurface of lug portion 16b to ensure against loss of engagement of the strap.

The fulcrum and tightening action produced by bolts 19, 21 is described further below in conjunction with the saddle or hub unit 24 and fulcrum elements 29, 31 formed at the sides thereof.

For the moment however as shown in FIGS. 1, 3, 7 and 8, it will be readily apparent that, preliminarily, strap 14 can be attached about pipe 13 with bolts 19, 21 being located at the sides of the location for the proposed branch passage 12. In order to make a fluid-tight branch line connection to passage 12, a saddle unit 24 formed with a threaded flow passage 26 is positioned in alignment with the position of the proposed passage 12. The undersurface of unit 24 compresses a resilient sealing gasket, such as the O-ring 27, against the annular margin 28 of the pipe surface encircling the region of the proposed fluid passage 12.

Rigid fulcrum elements 29, 31 formed with a relatively sharp fulcrum edge such as 29a are carried by unit 24 whereby bolts 19, 21 can be readily first connected to the ends of strap 14 and then easily moved onto the fulcrum elements. Thereafter, nuts 22 can be tightened to tension strap 14 about pipe 13 causing seal 27 to be compressed between unit 24 and pipe 13.

The tightening of strap 14 by means of nuts 22 acts upon unit 24 via the fulcrum elements 29, 31 so as to localize the application of forces to unit 24 while evenly distributing compressive forces about the pipe periphery throughout a large portion of the relatively long length of strap 14. Pressure applied by the bolts to the fulcrum points forces unit 24 against the pipe, permitting the saddle unit to rock and adjust to the pipe surface to distribute the pressure evenly to the gasket and pipe.

Thus, in the above manner of applying compressive forces to unit 24, each of bolts 19, 21 can be individually tightened whereby, in the event that a leak should occur between seal 27 and the surface of pipe 13, unit 24 can be tipped slightly in a longitudinal direction to close the leak merely by tightening one or the other of the two bolts 19, 21.

The fulcrum elements preferably lie substantially along an extension of the opposite ends of a diameter of the flow passage 26 and in a plane including the axis of the pipe.

In operation, it has been observed that the foregoing arrangement provides an improved means for applying pressure to the sealing gasket 27 whereby the forces of compression are evenly distributed about the gasket seal by acting directly downwardly against the fulcrum edge 29a. If the seal is tighter at one end of unit 24 along the pipe run than at the other, it is a simple matter to take up the slack on the other bolt by merely tightening the nuts 22.

Further, since the bolts will rock upon their respective fulcrum elements, the take-up tension will be evenly applied to both ends of strap 14.

Saddle unit 24 is formed to include a pair of rigid ramp portions 25 adapted to lie closely adjacent the surface of the pipe at a level to intercept nib 18 and deflect the leading edge of its associated lug 16 to ride upwardly against the inclined surface of the ramp 25.

In the usual circumstance, nib 18 will not reach ramp 25. However, in those circumstances where it does, the engagement of the leading edge of the lug with the ramp will develop a moment tending to tip the lug toward unit 24 thereby quickly taking up additional slack in strap 14.

Referring to FIG. 9, there is shown an embodiment according to the invention utilizing the structure referred to above but wherein there is combined a corporation stop 32 or other similar type valve means formed in integrated, fixed relation to a saddle unit portion 33 equipped, as above, with fulcrum elements 34, O-ring seal 36 and valve control cock 37. In this manner the saddle and stop have a very low profile and are readily usable with a wide range of pipe sizes. While not shown, it will be readily apparent from the above that the valve means can be disposed in a right angle elbow configuration as well as in the vertical configuration shown.

From the above, it will be apparent that the saddle assembly described above can be readily applied to a wide range of pipes with considerable convenience derived from the fact that the attaching and tightening mechanism is all located in the general region of the branch line outlet.

In tightening the saddle assembly by means of nuts 22, it should be observed (as noted above) that the undersurfaces of lugs 16 are formed to permit the lugs 16 to slide on the outer wall of the pipe. Ultimately, the folded-under ends 14a of strap 14 become tightly pinched between the lugs and the pipe even though sliding may continue.

Figure 11:
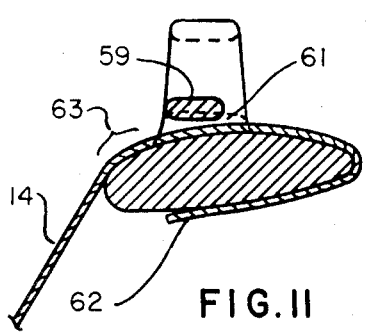
FIGS. 10 and 11 are respectively front and end elevation views, FIG. 11 being in section taken along the line 11—11 of FIG. 10.
Figure 10:
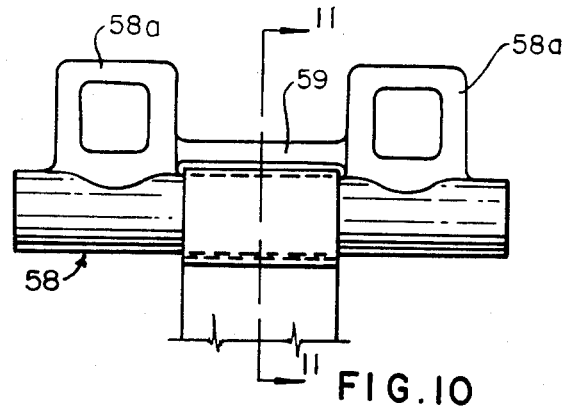

Referring to FIGS. 10 and 11, there is shown a lug 58 for use with the other embodiments and which is particularly designed to aid in the bending or folding under of the ends of straps 14.

Accordingly, lug 58 includes between the outwardly protruding bolt-receiving portions 58a a transversely extending bar 59 spaced slightly above the upper surface of the main body of lug 58. Accordingly, a gap or slot 61 has been defined to receive and confine the end of the strap, such as strap 14, and upon bending the end 62 of the strap around the body of lug 58, the trailing portion 63 will rise only slightly until it strikes the transverse bar 59 thereby aiding in retaining the strap to conform to the contour of the upper surface of lug 58.

Figure 13:
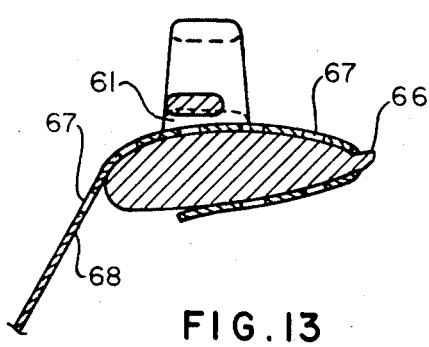
FIGS. 12 and 13 are respectively front and end elevation views, FIG. 13 being in section taken along the line 13—13 of FIG. 12.
Figure 12:
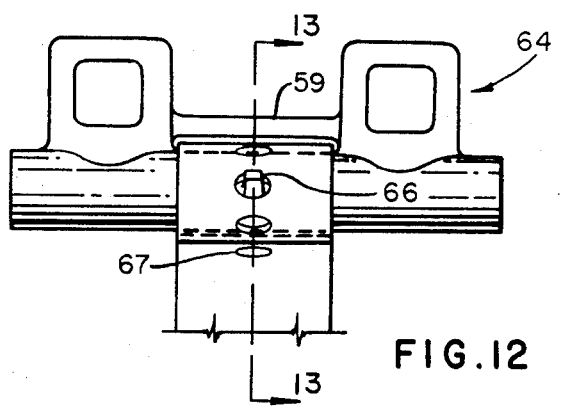

In addition to the above, a further improved lug 64 has been shown in FIGS. 12 and 13 containing the same transversely extending bar 59 and slot 61 but is further provided with positive engagement means such as the anchor pin or nib 66 projecting from the leading edge of the lug. Nib 66 is adapted to engage any one of several holes 67 or other openings formed through strap 68 as described earlier above, and in this manner, the perforations along the end region of the straps provide transverse lines of weakness laterally across strap 68 whereby the strap can more readily be bent at these predetermined positions.

Thus, each of the above two lugs includes a leading edge portion around which an end of the strap is folded or bent to conform thereto. The slot 61 at its position trailing (or behind) the leading edge portion holds the strap closely to the lug surface to permit the strap to be bent about the leading edge portion.

As shown in FIGS. 14, 15 and 16 the saddle unit further serves, additionally, to provide tightening of the flexible strap about the pipe line.

Accordingly, a flexible strap 69 encircles a run of pipe 71 formed with a flow passage 72 entering the pipe radially thereof.

Means for interconnecting the upper ends of strap 69 includes the flexible strap-extension collar 73 formed with a series of openings 74 aligned with openings 76 formed in the ends of strap 69. Thus, connecting bolts 77 can readily be inserted through adjacent aligned openings 74, 76.

Strap-extension collar 73 includes an intermediate portion characterized by a relatively large opening 78 and a pair of transversely extending lifting portions 79.

The saddle unit 81 comprises an annualr compression element 82 arranged to compress an O-ring gasket 83 against that margin of pipe surface encircling the outer edge of passage 72.

Compression element 82 cooperates with an exteriorly threaded hollow hub 84 which, in turn, is tapped at its upper end, for example, to threadedly receive a pipe connection 86.

A variation of the structure as shown in FIGS. 14-16 consists of providing (FIG. 17) the lower end of a corporation stop with the exterior threads of hub 84' as well as the wrench flats 85' and counter-bored lower end as shown for hub 84 whereby a corporation stop can be simply and easily connected to the pipe run.

Figure 17:
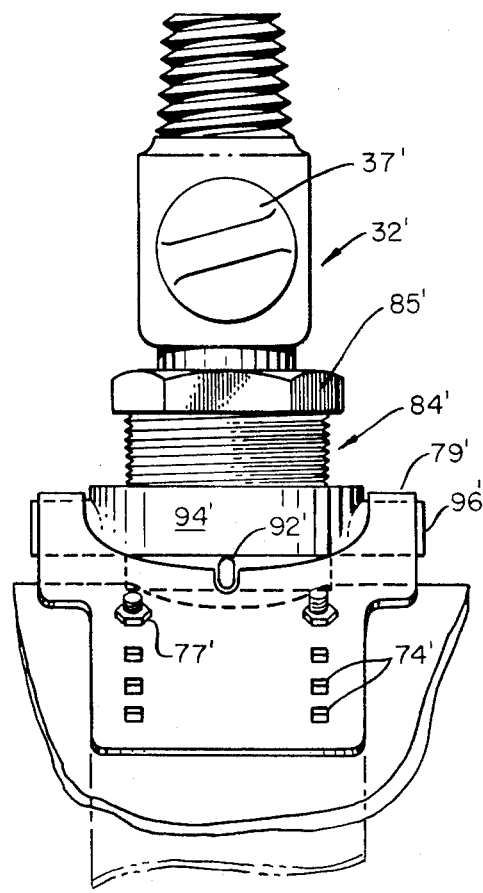
FIG. 17 is a side elevation view according to another embodiment employing a corporation stop in an arrangement similar to that shown in FIG. 14.

In FIG. 17 the parts and elements noted with reference numbers shown with a prime mark (') refer to components earlier described having the same number without the prime notation.

The exteriorly threaded hub 84 includes an enlarged cylindrical opening at its lower end adapted to receive a first cylindrical portion 87 therein in mutually rotatable relation. An O-ring 88 is carried about portion 87 so as to form a fluid seal between the movable cylindrical interface defined between hub 84 and the exterior of compression element 82.

The lower end 89 of hub 84 rides upon a transversely extending cylindrical shoulder 91 extending laterally outwardly of the exterior of element 82. In addition, element 82 includes positioning detents 92 which cooperate with notches 93 formed in the edge of collar opening 78 so as to prevent rotation of element 82 upon its sealing gasket 83.

Means for compressing gasket 83 includes the lifting collar 94 formed with diametrically oppositely extending fulcrum elements 96 which serve to support, from beneath, those transversely extending lifting portions 79 of the strap-extension collar 73. The interior of collar 94 is threaded to the exterior of hub 84.

In operation, it will be immediately apparent that hub 84 rides at all times in pressure-transmitting relation upon shoulder 91 of compression element 82. Thus, rotation of hub 84 serves to advance the lifting collar 94 upwardly along the threaded exterior of hub 84. As collar 94 progresses upwardly, it will be readily evident that the strap 69 becomes more tightly secured about pipe 71. As the tension in strap 69 increases, it will be further evident that the compression face defined beneath element 82 causes progressively greater compression of gasket 83. The force applied to gasket 83 is, as with the earlier embodiments, applied via the fulcrum elements 96 to evenly distribute sealing forces.

I claim:

1. A boss saddle valve construction for making a valve controlled connection to a fluid passage formed transversely into a pipe line comprising a flexible strap to be disposed about the pipe, the ends of said strap being disposed at the side of the pipe, valve means formed with a flow passage therein to be aligned with said fluid passage, a resilient seal between the bottom of the valve means and that annular margin of the pipe encircling said fluid passage, a pair of rigid fulcrum elements carried by said valve means and extending along the pipe, readily attachable means disposed across said fulcrum elements for interconnecting the ends of said strap, and means for tightening said strap about the pipe to compress said seal between said valve means an the pipe, the last named means acting upon the fulcrum elements to localize the application of forces thereto to compress said seal while evenly distributing compressive forces about the pipe periphery via said strap.

2. A boss saddle valve construction for making a tightly sealed valve controlled connection to a fluid passage formed transversely into a pipe line comprising a flexible strap to be disposed about the pipe, the ends of said strap being disposed at the side of the pipe and folded reversely under to dispose the end of the strap between the pipe and the strap, lugs disposed in the folds and formed to include projecting portions having bolt-receiving passages therein, valve means formed with a flow passage therein to be aligned with said fluid passage and including a pressure portion at the lower end thereof, a resilient seal between the bottom of said portion and that annular margin of the pipe encircling said fluid passage, a pair of rigid elements carried by said valve means, bolts in said bolt-receiving passages and engaging said rigid elements for interconnecting the ends of said strap thereacross, and means at said side of the pipe for tightening said strap about the pipe to bind each of the underfolded ends of the strap between its associated lug and said pipe while compressing said seal between said pressure portion and the pipe via forces applied to said rigid elements to localize the application of forces thereto to compress said seal while evenly distributing compressive forces about the pipe periphery via said strap.

3. A boss saddle valve construction for making a tightly sealed connection to a fluid passage formed transversely into a pipe line comprising a flexible band to be strapped about the pipe, the ends of said strap being disposed atop the pipe, valve means including a pressure portion formed with a flow passage therein to be aligned with said fluid passage, a resilient seal between the bottom of said portion and that annular margin of the pipe encircling said fluid passage, a pair of rigid elements carried by said valve means and extending along the pipe for receiving compressive sealing forces locally applied thereto, readily attachable means for interconnecting the ends of said strap across said rigid elements, and means atop the pipe threadedly movable between advanced and retracted positions with respect to said pressure portion for drawing said rigid elements radially away from said pipe for tightening the strap about the pipe to compress said seal between said pressure portion and the pipe, the last named means acting upon said portion via the rigid elements to localize the application of forces thereto to urge said portion straight against said seal.

4. A unitary valve assembly for making direct connection to a fluid passage formed transversely into a pipeline comprising a flexible strap to be disposed about the pipe, boss means formed with a flow passage to be aligned with said fluid passage, a resilient sealing element disposed between the bottom of the boss means and that annular margin surface of the pipe encircling said fluid passage, said boss means including an annular compression element formed to include a portion of said flow passage, said compression element having an undersurface for pressing against said sealing element and a force-receiving portion formed thereabove, a valve having an exteriorly threaded, hollow, elongate body portion forming a flow passage therein, said exteriorly threaded body portion bearing against said force-receiving portion, a collar formed with rigid fulcrum elements each having a narrow support edge extending in the direction of the pipe, said collar being threaded onto said body portion for rotation relative thereto, means interconnecting the ends of the strap disposed across said fulcrum elements, said collar threadedly encircling said threaded body portion to be drawn upwardly therelong during rotation of said body portion while said collar is held from rotating by said interconnecting means disposed across said fulcrum elements.

* * * * *